United States Patent
Poddar et al.

(10) Patent No.: US 7,432,937 B2
(45) Date of Patent: Oct. 7, 2008

(54) SYSTEM AND METHOD FOR CONCAVE POLYGON RASTERIZATION

(75) Inventors: Bimal Poddar, El Dorado Hills, CA (US); Avinash Seetharamaiah, Chuluota, FL (US)

(73) Assignee: Intel Corporation, Santa Clara, CA (US)

( * ) Notice: Subject to any disclaimer, the term of this patent is extended or adjusted under 35 U.S.C. 154(b) by 362 days.

(21) Appl. No.: 11/170,923

(22) Filed: Jun. 30, 2005

(65) Prior Publication Data

US 2007/0002074 A1    Jan. 4, 2007

(51) Int. Cl.
 *G09G 5/02* (2006.01)
 *G09G 5/36* (2006.01)
 *G06T 15/40* (2006.01)
 *G06T 17/00* (2006.01)

(52) U.S. Cl. .................. 345/592; 345/545; 345/549; 345/588; 382/283

(58) Field of Classification Search ......... 345/421–423, 345/581–583, 588–589, 592, 545, 549; 382/282–283; 348/626, 661
See application file for complete search history.

(56) References Cited

U.S. PATENT DOCUMENTS

| | | | | |
|---|---|---|---|---|
| 5,123,085 A | * | 6/1992 | Wells et al. | 345/421 |
| 6,597,363 B1 | * | 7/2003 | Duluk et al. | 345/506 |
| 6,603,482 B1 | * | 8/2003 | Tidwell | 345/592 |
| 2003/0201994 A1 | * | 10/2003 | Taylor et al. | 345/581 |

* cited by examiner

*Primary Examiner*—Wesner Sajous
(74) *Attorney, Agent, or Firm*—Buckley, Maschoff & Talwalkar LLC

(57) ABSTRACT

An apparatus and method to render concave polygons. In some embodiments, the method includes setting an alpha buffer of a hardware rasterizer to zero, generating an alpha mask by rendering the concave polygon as a plurality of convex polygons of connected vertices, wherein an alpha value for each of the plurality of the plurality of polygons is toggled between a zero value and a second non-zero value on successive renderings of each portion of the plurality of the convex polygons. The alpha values may be stored in the alpha buffer, and the plurality of convex polygons may be re-rendered based on the generated alpha mask, where the stored alpha value is the second non-zero value.

24 Claims, 4 Drawing Sheets

SYSTEM AND METHOD FOR CONCAVE POLYGON RASTERIZATION

BACKGROUND

Regarding computer graphics, the rendering of convex shapes may be accomplished by representing the shape by a number of convex polygons. The rendering of convex polygons may be handled by any of a number of, for example, hardware implemented rasterizers. However, hardware rasterizers may not be capable of rendering concave polygons either properly, efficiently or at all. The rendering of concave polygons using such hardware is undefined and, mostly, produces incorrect results. A typical approach to rendering concave polygons involves tessellating the geometry of the concave object into convex polygons (e.g., triangles) and forwarding the obtained convex polygons to a hardware rasterizer.

However, the processes to tessellate the geometry is complex, computationally expensive, and can include processor and data intensive operations. For example, triangulation may result in an increase in the number of vertices used to represent an object shape. Thus, the computational effort to render the shape increases.

Accordingly, there exists a need for a method and apparatus to efficiently render concave polygons.

DETAILED DESCRIPTION

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

Some computer graphics systems and processing techniques use a 32-bit display buffer to represent graphics data. The 32-bit color buffer may comprise four channels, each channel being 8-bits wide. The color buffer may have a red (R) channel, a blue (B) channel, a green (G) channel, and an alpha ($\propto$) channel. The RGB channels may store data regarding red, blue, and green color attributes of an object. The alpha channel may store data regarding a transparency attribute of the object. However, some graphics systems, including for example, a number of graphics systems compatible with a desktop computer system, may only use the RGB channels for the rendering of an object even though the alpha channel is available.

Figure 1:
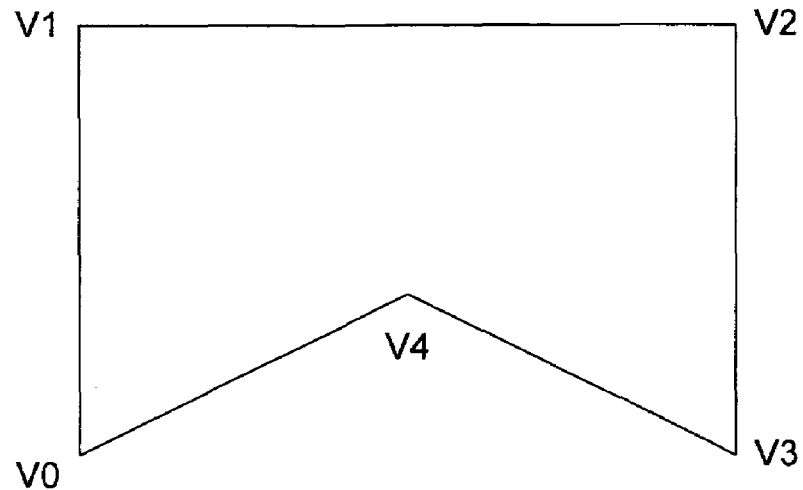
FIG. 1 is an exemplary illustration of a polygon to be rendered, according to some embodiments herein.

In some embodiments, a concave object such as polygon 100 in FIG. 1 may be rendered, in accordance with a graphics system and method herein. Polygon 100 includes a number of vertices. In some embodiments, polygon 100 is rendered as a sequence of the vertices thereof. Regarding polygon 100, the sequence of vertices are vertices V0, V1, V2, V3, and V4. Polygon 100 may be segmented into a number of triangles by connecting a number of vertices V0, V1, V2, V3, and V4 together to encompass polygon 100. For example, polygon 100 may be represented by three triangles. The three triangles may be defined by a sequence of three vertices, as follows:

V0_V1_V2
V0_V2_V3
V0_V3_V4

As understood by those skilled in the art, a hardware implemented rasterizer or graphics engine may be use to efficiently render a number of convex polygons, such as the three triangles listed above.

Figure 2:
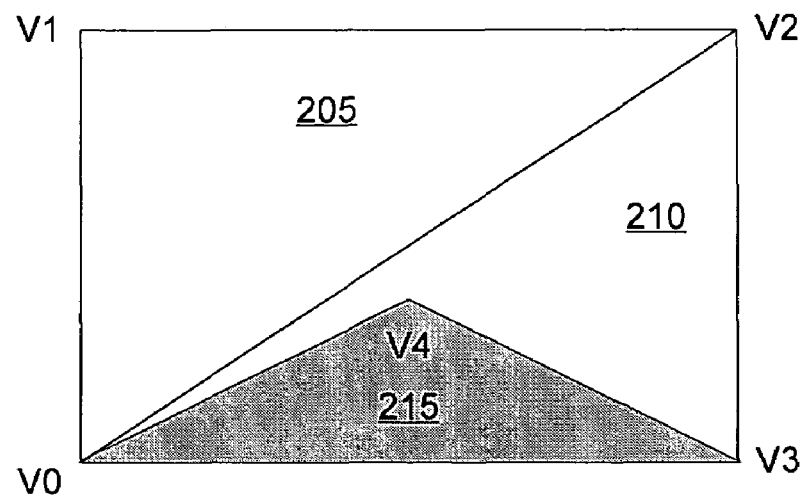
FIG. 2 is an exemplary segmentation of the polygon of FIG. 1, according to some embodiments herein.

FIG. 2 provides an illustration of object 100 divided into the three triangles formed by connecting the vertices of the polygon to encompass polygon 100 using triangles. As shown, three triangles 205, 210, and 215 are formed. However, triangle 215 should not be included in a final rendering since triangle 215 is outside of the desired concave polygon 100. That is, the shaded area of FIG. 2, triangle 215 (V0_V3_V4), is not rendered in order to obtain polygon 100.

Accordingly, in some embodiments herein, a hardware rasterizer is used to generate a mask using in an alpha buffer of the rasterizer. The alpha buffer may be used in some embodiments hereof by leveraging the availability of the unused alpha buffer, with regard to some graphics systems and rendering methodologies. In some embodiments, an alpha mask is generated in an alpha buffer by rendering the polygon as a sequence of vertices (e.g., triangles V0_V1_V2, V0_V2_V3, and V0_V3_V4). Each sequence of vertices may be a convex object such as, for example, a triangle and has an alpha value associated therewith.

In some embodiments, each pixel in the frame buffer is assigned one of two alpha values (i.e., states). The two possible alpha values may be generally referred to as a first alpha value and a second alpha value. In some embodiments, the first and second alpha values are, respectively, zero (0) and one (1). An alpha value of 1 may be used to indicate that a sequence of vertices assigned an alpha value of 1 should be rendered whereas a sequence of vertices assigned an alpha value of 0 should not be rendered. Thus, convex polygons 205 and 210 should be rendered and convex polygon 215 should not be rendered in order to obtain concave polygon 100, in accordance with some embodiments herein.

The alpha values, 0 or 1, are obtained in a process of generating the alpha mask. The alpha buffer is initially set to 0. The alpha value is toggled between zero and a non-zero second value (e.g., 1) on successive renderings of a particular area of a polygon. For example, polygon 205 (V0_V1_V2) and polygon 210 (V0_V2_V3) are rendered. The alpha value for each is toggled from 0 to 1 and the alpha value of 1 is stored in the alpha buffer of the rasterizer for areas, pixels, fragments in polygons 205 and 210. Upon rendering polygon 215 (V0_V3_V4), the alpha value for the pixels enclosed in the area of polygon 215 are toggled from 1 to 0. Note that the pixels in the area defined by polygon 215 were previously set to a 1 during the previous rendering of polygon 210.

The color attributes (RGB) for polygons 205, 210, and 215 are not updated or rendered during the generation of the alpha mask. The color attributes are persevered for polygons 215 as would be required for correct rendering of the concave polygon 100.

Whether polygon 210 or 215 is drawn first is not critical since the alpha buffer is initially set to 0 and the alpha value for each pixel is toggled between 0 and non-zero 1 on successive renderings thereof. Thus, the shaded are of FIG. 2 is overdrawn or rendered twice to yield an alpha value of 0 (alpha value: 0 to 1, 1 to 0) whereas the other areas are only drawn once and have an alpha value of 1 (alpha value: 0 to 1). It is noted that an odd number of renderings for an area or pixel results in an alpha value of 1 and an even number of renderings for an area or pixel results in an alpha value of 0.

Another or second rendering by the rasterizer is performed using the generated alpha mask as a basis to selectively update the color (RGB) attributes for the three polygons 205, 210, and 215 of polygon 100. For the pixels or areas of polygon 100 having an alpha value of 1 (i.e., non-zero), the color attributes of the pixel or area are updated. For the pixels or areas outside of polygon 100 such as polygon 215 having an alpha value of 0 (i.e., zero), the color attributes of the pixel or area are not updated. In this manner, each pixel, area, or fragment of polygon 100 that is interior to the concave polygon is rendered or rasterized using an alpha buffer that stores alpha values of an alpha mask.

Figure 3:
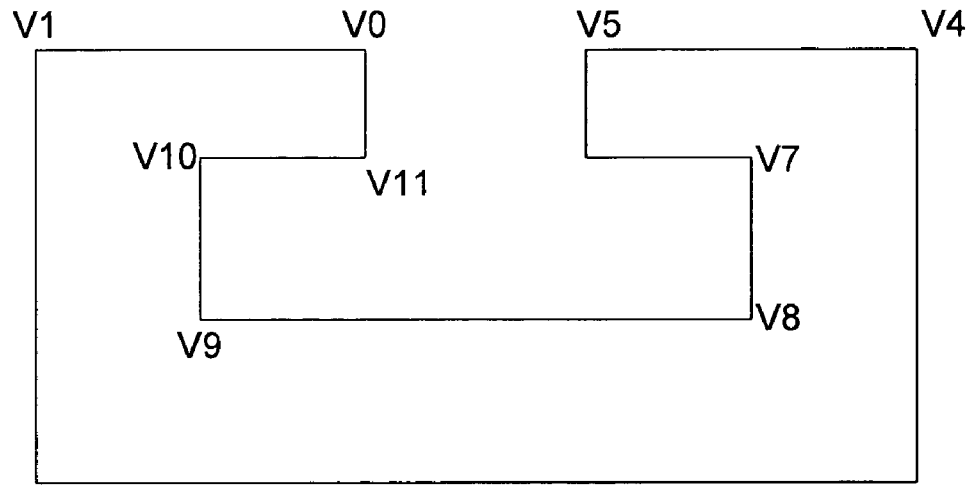
FIG. 3 is an exemplary illustration of a polygon to be rendered, according to some embodiments herein.
Figure 4:
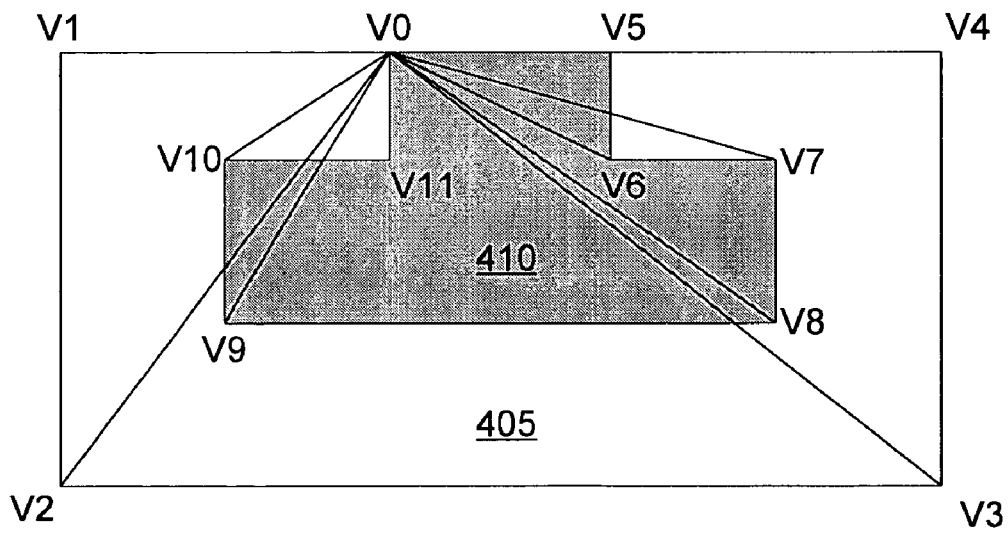
FIG. 4 is an exemplary segmentation of the polygon of FIG. 3, according to some embodiments herein.

FIGS. 3 and 4 illustrate another example of a concave polygon that may be rendered by some of the methods herein. Concave polygon 300 may be divided into ten convex polygons (i.e., triangles) as follows:

V0_V1_V2 V0_V2_V3
V0_V3_V4 V0_V4_V5
V0_V5_V6 V0_V6_V7
V0_V7_V8 V0_V8_V9
V0_V9_V10 V0_V10_V11

Referring to FIG. 4, in a manner similar to that described regarding FIG. 2, the shaded area 410 has an alpha value of 0 whereas as the other areas have an alpha value of 1 after renderings of the various triangles listed above. The shade area 410 is not re-rendered and the area 405 is re-rendered, in accordance with some embodiments herein, provide concave polygon 300 based on an alpha mask generated for the ten convex polygons listed above.

Figure 5:
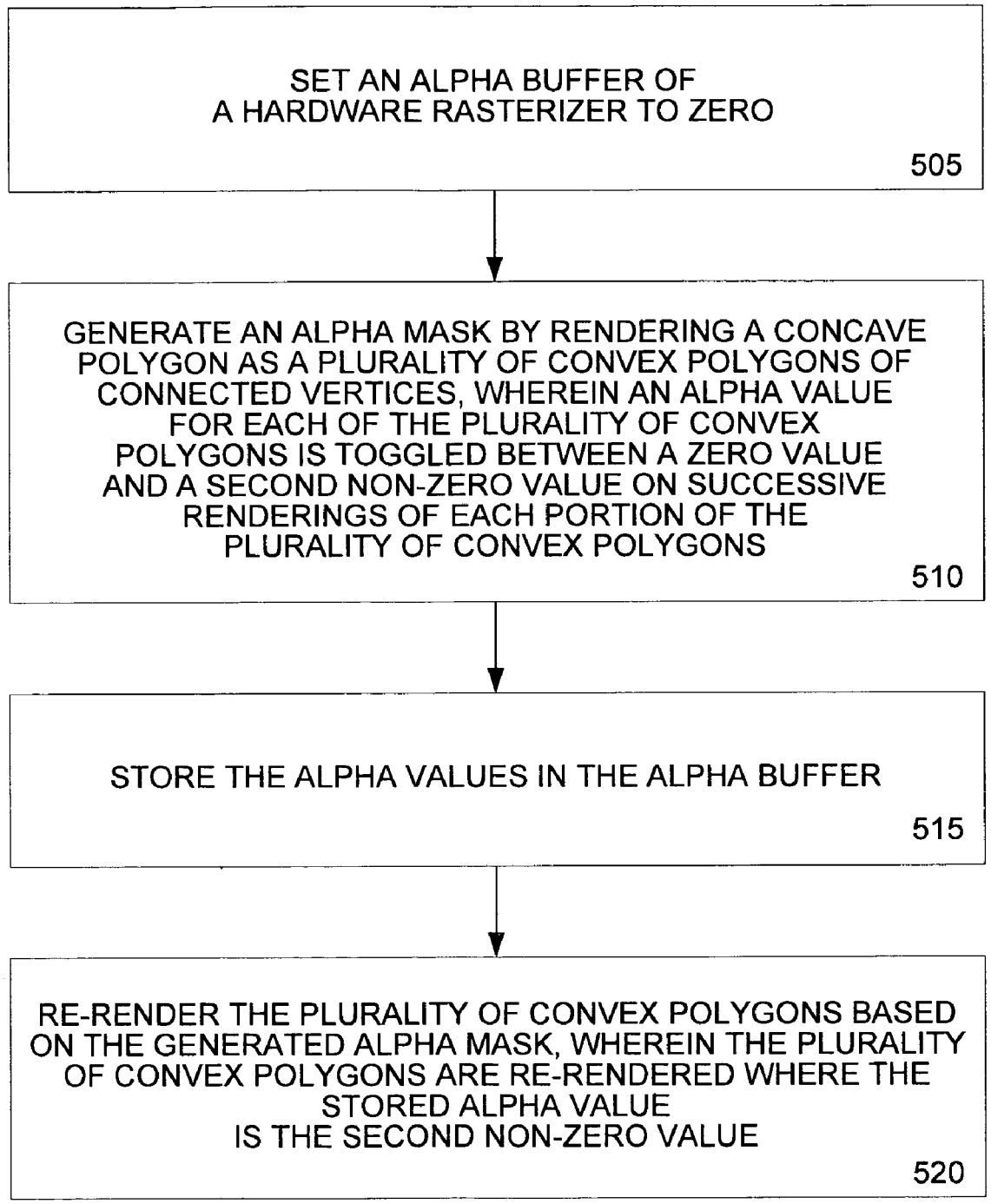
FIG. 5 is an exemplary flow diagram of a method, according to some embodiments herein.

The following is an exemplary listing of code or program instructions that may be used to implement a method or process, in accordance with some embodiments herein. FIG. 5 is an exemplary flow diagram of an exemplary method 500, in accordance with some embodiments herein. FIG. 5 may be referenced in conjunction with the following code listing discussion.

In an initialization operation 505, the alpha buffer is cleared to zero. Also, a blending function may be enabled. The blending function will be used in operations of process 500.

An alpha mask is generated at operation 510. Generation of the alpha mask in an alpha buffer may include disabling a write function for the RGB channels while enabling a write function for the alpha function. In this manner, color attributes for an area, pixel, or fragment may be preserved. Code may include:

redMask=greenMask=blueMask=FALSE
alphaMask=TRUE
ColorMask (redMask, greenMask, blueMask, alphaMask)

Also, a blend function may be established such that it toggles the value for the alpha buffer from a 0 to a non-zero value (e.g., 1) and from the non-zero value to zero. It should be remembered that the alpha buffer was cleared to all zeros during the initialization, operation 505. Thus, if the value in the alpha buffer is 0, it will be toggled to 1, and if it is 1 then it will be toggled to zero. In this manner, the alpha value in the alpha buffer will be 1 where the area, pixel, fragment should be rendered and 0 in the area, pixel, fragment that should not be rendered. These processes may be implemented with code to capture the following:

$$FinalRGB = srcRGB * 1.0 + dstRGB * 0.0 \quad (1)$$

$$FinalAlpha = srcAlpha * (1-dstAlpha) + dstAlpha * 0.0 \quad (2)$$

RGB blend function factors may be established, as well as the establishment of an alpha blend function, as follows:

```
BlendFuncRGB (ONE, ZERO);
BlendFuncAlpha (ONE_MINUS_DST_ALPHA, ZERO);
DrawPolygon ( );
```

Herein, "src" refers to a source area, pixel, or fragment that is being worked on, in the process of being drawn. Also, "dst" refers to a destination area, pixel, or fragment that is old, previously or already drawn.

The alpha values are stored in the alpha buffer in an operation 515. The alpha buffer storage may be a local memory such as cache on a graphics card, subsystem, engine, or the like.

At operation 520, the polygon is re-render based on the generated and alpha values stored in the alpha mask. During this process of rendering by the rasterizer, writing to the color channels is enabled to provide a final rendering of the subject polygon. The alpha write function remains enabled, it is not disabled. Writing to the alpha buffer during this passage through the rasterizer operates to toggle the alpha values to zero for rendered polygons. In this manner, there is no need to clear the alpha buffer to zeros, as was done during initialization operation 505.

For areas, pixels, and fragments that are rendered an even number of times during the alpha mask generation, the alpha value is 0 and such areas, pixels, and fragments are not drawn. Also, the destination color for such areas, pixels, and fragments must be preserved since there is no kill (i.e., don't draw the pixel) function for an alpha buffer in a hardware rasterization.

For areas, pixels, and fragments that were rendered an odd number of times during the alpha mask generation, the alpha value is 1. This mans that such areas, pixels, and fragments are interior to the subject concave polygon. Thus, the destination (i.e., old) areas, pixels, and fragments are overwritten with the incoming areas, pixels, and fragments (i.e., source) color attributes. These processes may be implemented with code to capture the following:

$$FinalRGB = srcRGB * dstAlpha + dstRGB * (1-dstAlpha) \quad (3)$$

$$FinalAlpha = srcAlpha * 0.0 + dstAlpha * 0.0 \quad (4)$$

Thus, if "dstAlpha" was 1.0, then equation 3 reduces to FinalRGB=srcRGB, meaning the polygon (areas, pixels, and fragments) should be drawn. If "dstAlpha" was 0.0, then equation 3 reduces to FinalRGB=dstRGB, meaning the previous RGB attributes for the areas, pixels, and fragments should be preserved. That is, the previous RGB attributes are copied. In this manner the present process 500 simulates the "kill" function.

Further, the following code may be used to implement operation 520, including drawing (i.e., rendering) the areas, pixels, and fragments of the subject polygon again.

```
BlendFuncRGB (DST_ALPHA, ONE-MINUS_DST_ALPHA);
BlendFuncAlpha (ZERO, ZERO);
DrawPolygon ( );
```

In some embodiments herein, faster rendering of an object may be achieved due, in part, to the disabling of writes to the color buffer for RGB atributes during the generation of the alpha mask (operation 510). By disabling the write function for the color buffer, the original destination color is preserved, and write operations to the color buffer may be reduced. Accordingly, traffic to a memory may be reduced.

In some embodiments, the alpha buffer is set to zero as discussed above regarding operation 520. Such a process avoids a process wherein the entire alpha buffer is cleared or "zeroed" repeatedly. In this manner, the alpha buffer may only be initialized or "zeroed" during the initialization operation.

Process 500 and other methods hereof may be implemented in a hardware rasterizer that renders convex polygons since methods herein provide a method to render concave polygons using an alpha mask and alpha buffer to render convex polygons. Again, methods herein leverage alpha buffers that may be available but not used in many graphics rasterizers and graphics engines. In this manner, some embodiments herein may be implemented without additional memory requirements.

Figure 6:
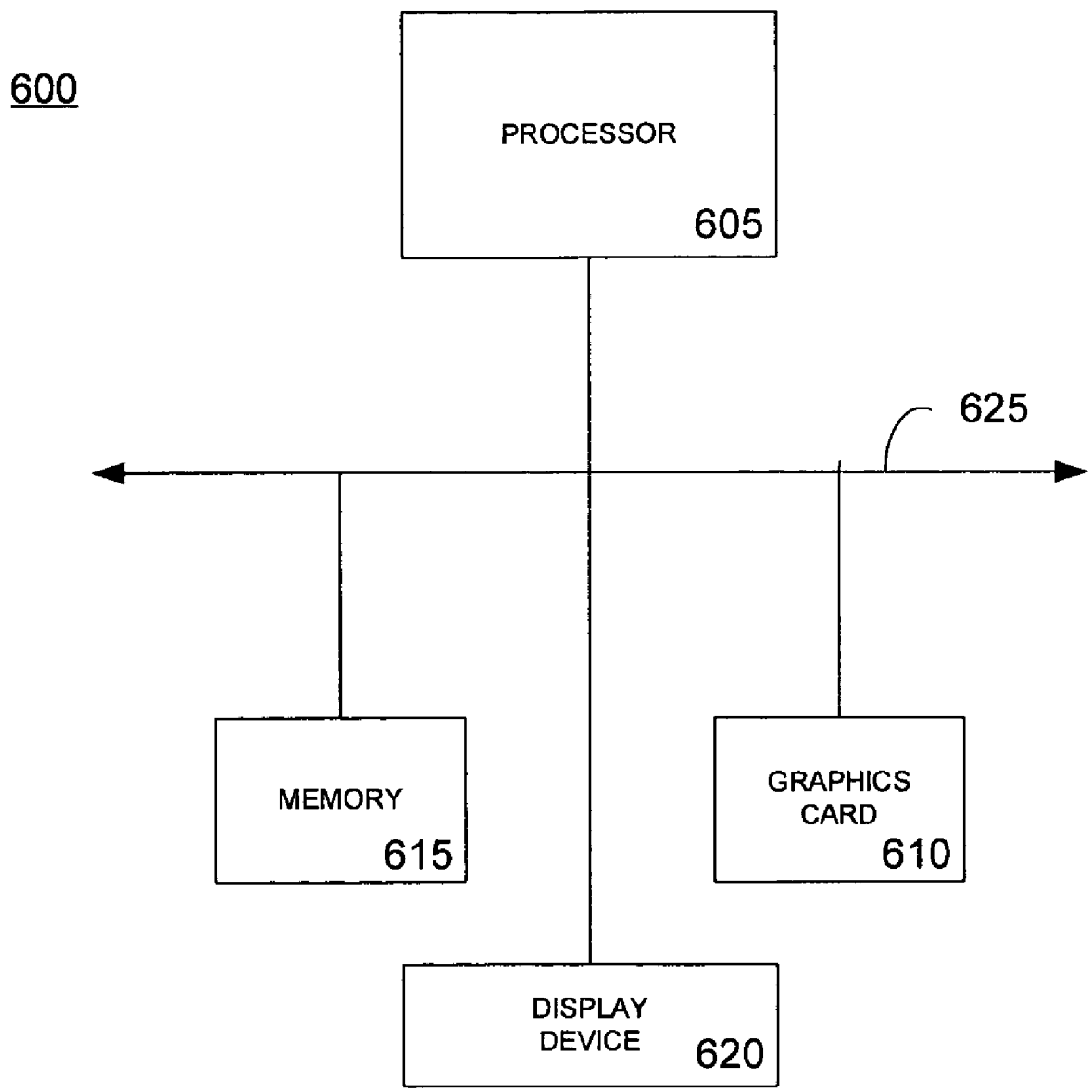
FIG. 6 is a system to render polygons, in accordance with some embodiments herein.

FIG. 6 is an exemplary, simplified system 600 that may be used to implement an apparatus and method, in accordance with some embodiments herein. System 600 includes a processor 605, a graphics card or graphics engine 610 including a rasterizer to render graphics for a display device, a memory 615, and a display 620 to display graphics rendered by graphics card 610. Those skilled in the art will recognize that other, additional, alternative, or substitute components and devices may be included in some embodiments of system 600, such as, for example, an I/O control hub, a memory controller, and other components and devices that may be used in a computing system. Bus 625 may provide a communication link between the various component and devices.

In some embodiments, graphics card 610 includes a processor and memory for processing graphics instructions and storing graphics data, such as buffer data. For some storage needs, memory 615 may be used for some graphics operations. For efficient processing of graphics operations, processing and memory storage may, in some embodiments, be performed primarily by hardware implementations on graphics card 610. The methods for rendering concave polygons discussed in detail herein may be executed by graphics card 610. The polygons thus rendered by graphics card 610 in accordance with some of the embodiments herein may be displayed by display 620.

The foregoing disclosure has been described with reference to specific exemplary embodiments thereof. It will, however, be evident that various modifications and changes may be made thereto without departing from the broader spirit and scope set forth in the appended claims.

What is claimed is:

1. A method to render a concave polygon, the method comprising:
    setting an alpha buffer of a hardware rasterizer to zero;
    generating an alpha mask by rendering the concave polygon as a plurality of convex polygons of connected vertices, wherein an alpha value for each of the plurality of the convex polygons is toggled between a zero value and a second non-zero value on successive renderings of each portion of the plurality of the convex polygons;
    storing the alpha values in the alpha buffer; and
    re-rendering the plurality of convex polygons based on the generated alpha mask, wherein the plurality of convex polygons are re-rendered where the stored alpha value is the second non-zero value.

2. The method of claim 1, further comprising enabling an alpha blend function, wherein the generating of the alpha mask uses the alpha blend function to determine the alpha value for the plurality of convex polygons.

3. The method of claim 1, further comprising not enabling a write function for RGB (red, green, blue) values during the generating of the alpha mask.

4. The method of claim 1, further comprising enabling a write function for RGB (red, green, blue) values during the re-rendering of the plurality of convex polygons.

5. The method of claim 2, wherein the re-rendering of the plurality of convex polygons further comprises setting the alpha mask to zero.

6. The method of claim 1, wherein the setting of the alpha buffer to the zero value is performed only once.

7. The method of claim 1, further comprising enabling a RGB blend function to preserve RGB values during the generating of the alpha mask and to write RGB values during the re-rendering of the plurality of convex polygons.

8. An apparatus to render a concave polygon comprising:
    an alpha buffer;
    a RGB buffer; and
    a controller, wherein the controller is operative to:
        set the alpha buffer of to zero;
        generate an alpha mask by rendering the concave polygon as a plurality of convex polygons of connected vertices, wherein an alpha value for each of the plurality of the convex polygons is toggled between a zero value and a second non-zero value on successive renderings of each portion of the plurality of the convex polygons;
        store the alpha values in the alpha buffer; and
        re-render the convex polygons based on the generated alpha mask, wherein the plurality of convex polygons are re-rendered where the stored alpha value is the second non-zero value.

9. The apparatus of claim 8, further comprising the controller to enable an alpha blend function, wherein the generating of the alpha mask uses the alpha blend function to determine the alpha value for the plurality of convex polygons.

10. The apparatus of claim 8, further comprising the controller to not enable a write function for RGB (red, green, blue) values during the generating of the alpha mask.

11. The apparatus of claim 8, further comprising the controller enable a write function for RGB (red, green, blue) values during the re-rendering of the plurality of convex polygons.

12. The apparatus of claim 9, wherein the re-rendering of the plurality of convex polygons further comprises setting the alpha mask to zero.

13. The apparatus of claim 8, wherein the setting of the alpha buffer to the zero value is performed only once.

14. The apparatus of claim 8, further comprising the controller to enable a RGB blend function to preserve RGB values during the generating of the alpha mask and to write RGB values during the re-rendering of the plurality of convex polygons.

15. A computer readable medium having computer executable instructions stored thereon for performing a method to render a concave polygon, the method comprising:
    setting an alpha buffer of a hardware rasterizer to zero;
    generating an alpha mask by rendering the concave polygon as a plurality of convex polygons of connected vertices, wherein an alpha value for each of the plurality of the convex polygons is toggled between a zero value and a second non-zero value on successive renderings of each portion of the plurality of convex polygons;

storing the alpha values in the alpha buffer; and re-rendering the plurality of convex polygons based on the generated alpha mask, wherein the plurality of convex polygons are re-rendered where the stored alpha value is the second non-zero value.

16. The medium of claim 15, further comprising enabling an alpha blend function, wherein the generating of the alpha mask uses the alpha blend function to determine the alpha value for the plurality of convex polygons.

17. The medium of claim 15, further comprising not enabling a write function for RGB (red, green, blue) values during the generating of the alpha mask.

18. The medium of claim 15, further comprising enabling a write function for RGB (red, green, blue) values during the re-rendering of the plurality of convex polygons.

19. The medium of claim 15, wherein the re-rendering of the plurality of convex polygons further comprises setting the alpha mask to zero.

20. The medium of claim 15, wherein the setting of the alpha buffer to the zero value is performed only once.

21. The medium of claim 15, further comprising enabling a RGB blend function to preserve RGB values during the generating of the alpha mask and to write RGB values during the re-rendering of the plurality of convex polygons.

22. A system to render a concave polygon comprising:
a memory; and
a hardware rasterizer comprising:
  an alpha buffer;
  a RGB buffer; and
  a controller, wherein the controller is operative to:
  set the alpha buffer of to zero;
  generate an alpha mask by rendering the concave polygon as a plurality of convex polygons of connected vertices, wherein an alpha value for each of the plurality of the triangles is toggled between a zero value and a second non-zero value on successive renderings of each portion of the plurality of plurality of convex polygons;
  store the alpha values in the alpha buffer; and
  re-render the plurality of convex polygons based on the generated alpha mask, wherein the plurality of convex polygons are re-rendered where the stored alpha value is the second non-zero value.

23. The system of claim 21, further comprising enabling an alpha blend function, wherein the generating of the alpha mask uses the alpha blend function to determine the alpha value for the plurality of convex polygons.

24. The system of claim 21, further comprising not enabling a write function for RGB (red, green, blue) values during the generating of the alpha mask.

* * * * *